(12) United States Patent
Frank

(10) Patent No.: US 10,791,354 B2
(45) Date of Patent: Sep. 29, 2020

(54) METHOD FOR REAL-TIME ADVERTISING-FREE LINEAR TELEVISION VIEWING ON CHANNEL IN USE WITH MICROPAYMENT COMPENSATION TO NETWORKS FOR LOST ADVERTISING REVENUE

(71) Applicant: ADYAH TV, LLC, Westport, CT (US)

(72) Inventor: Neal H. Frank, Westport, CT (US)

( * ) Notice: Subject to any disclaimer, the term of this patent is extended or adjusted under 35 U.S.C. 154(b) by 0 days.

(21) Appl. No.: 16/438,039

(22) Filed: Jun. 11, 2019

(65) Prior Publication Data

US 2020/0007918 A1 Jan. 2, 2020

Related U.S. Application Data

(60) Provisional application No. 62/691,401, filed on Jun. 28, 2018.

(51) Int. Cl.
| | | |
|---|---|---|
| H04N 21/254 | (2011.01) | |
| H04N 21/2543 | (2011.01) | |
| H04N 21/81 | (2011.01) | |

(52) U.S. Cl.
CPC ... *H04N 21/25435* (2013.01); *H04N 21/2541* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 9,742,871 B1* | 8/2017 | Gibson | H04L 67/327 |
| 2014/0143806 A1* | 5/2014 | Steinberg | G11B 27/034 |
| | | | 725/34 |
| 2015/0121554 A1* | 4/2015 | Trimper | G06F 21/10 |
| | | | 726/29 |
| 2016/0267065 A1* | 9/2016 | Drey | G06F 40/169 |

\* cited by examiner

*Primary Examiner* — Mulugeta Mengesha
*Assistant Examiner* — Charles N Hicks
(74) *Attorney, Agent, or Firm* — Notaro, Michalos & Zaccaria P.C.

(57) ABSTRACT

Methods are disclosed for providing advertising-supported television, including linear television, on-demand or DVR television using the programmability and Internet-connectivity of modern "smart" televisions and/or "smart" cable set top boxes, "smart" DVRs, and "smart" streaming devices to enable viewers to selectively opt-out of advertisements for individual, enabled programs, while compensating broadcasters for the resulting loss of advertising revenue. For a subscription fee, viewers on the TV channel in use (without requiring an input change or subscription to an "over-the-top" service) can seamlessly view their favorite shows entirely ad-free on TV channels. Upon delivering the ad-free experience, software is used to calculate and remit household-level micropayments of lost program ad revenue for participating networks.

12 Claims, 8 Drawing Sheets

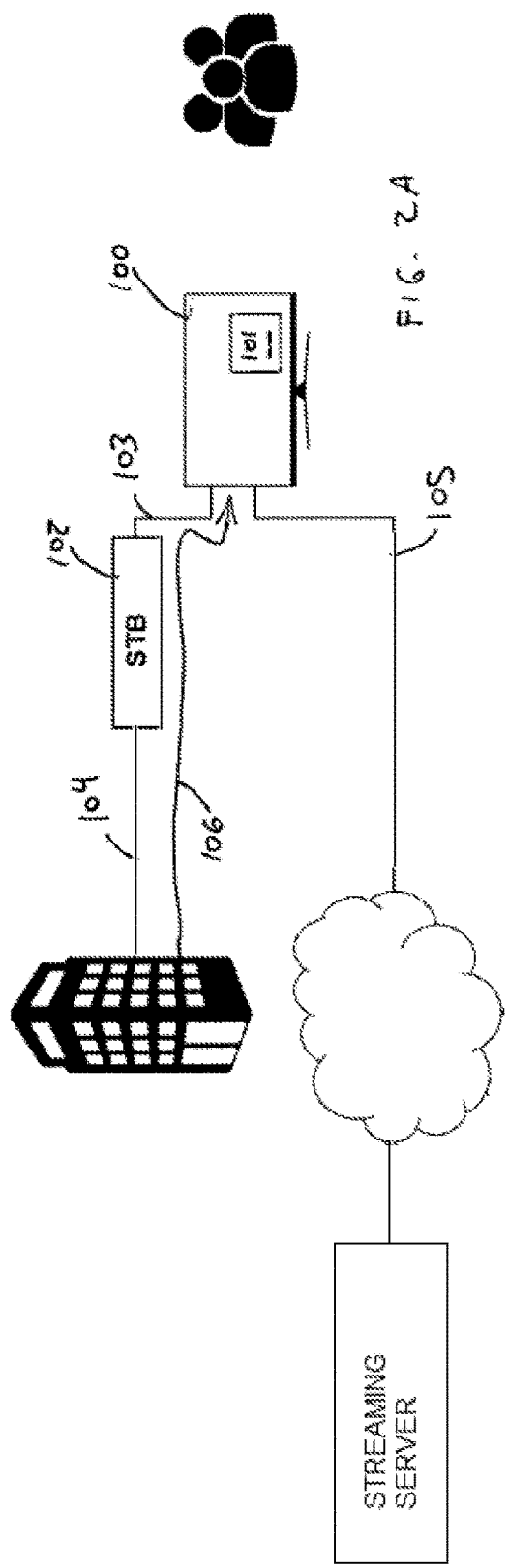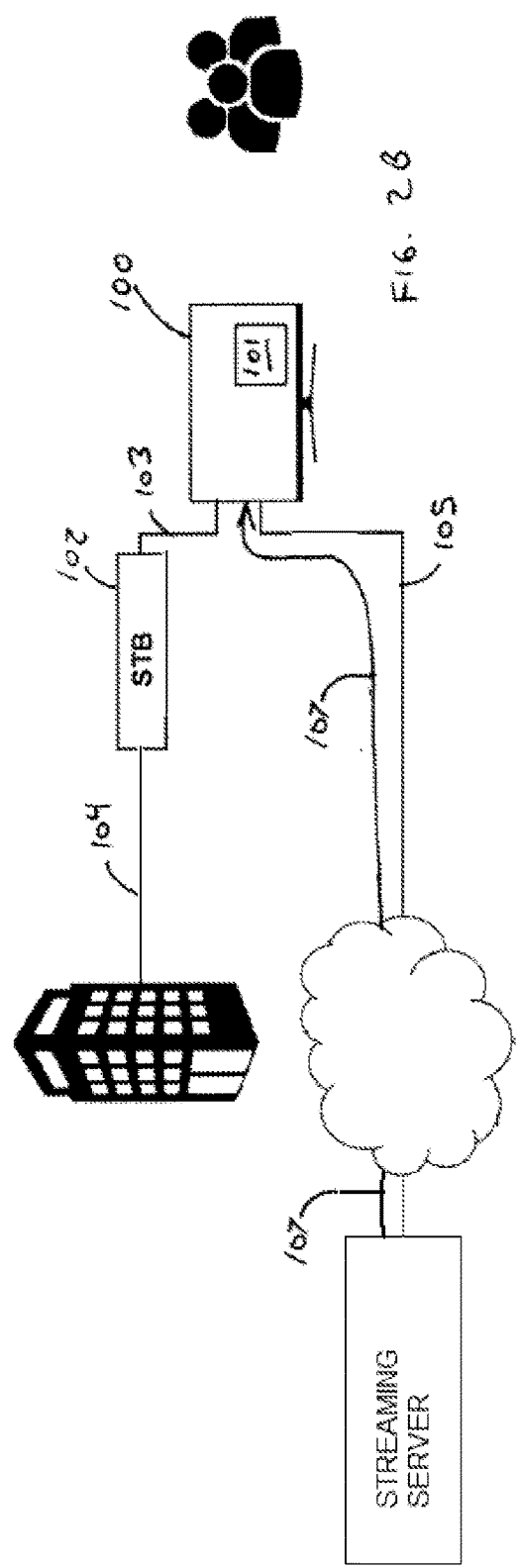

OPTING OUT

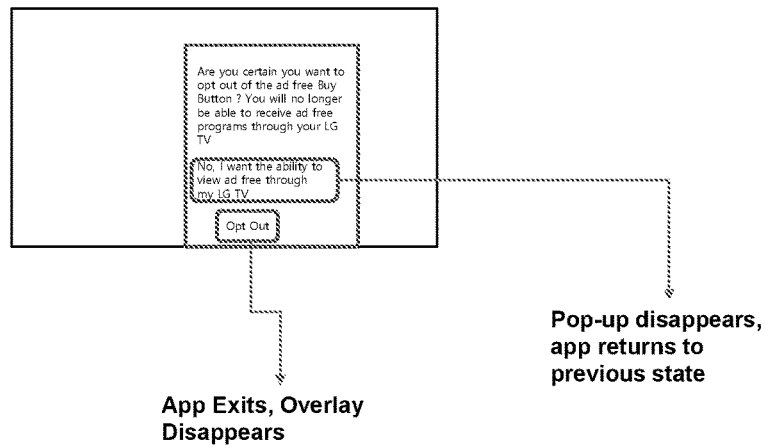

Optout pop-up. We get here from various pages when the consumer clicks the Decline link in the Terms box. If they do opt out, the app exits and disappears. If they choose "No", then this pop up will disappear and the consumer will be at the same point they were when they clicked the Terms link.

App Exits, Overlay Disappears

Pop-up disappears, app returns to previous state

FIG. 8

METHOD FOR REAL-TIME ADVERTISING-FREE LINEAR TELEVISION VIEWING ON CHANNEL IN USE WITH MICROPAYMENT COMPENSATION TO NETWORKS FOR LOST ADVERTISING REVENUE

BACKGROUND OF THE INVENTION

The subject technology relates to advertising-supported television. The production and provision of television programming has been traditionally supported by advertising sales. Commercial, linear television channels broadcast via cable or over-the-air means may broadcast paid advertisements at intervals during their programming schedules. These advertising intervals may interrupt a program, or be placed between programs.

There is an ongoing change in viewing habits to the disadvantage of advertising-supported linear television. Some viewers skip broadcast advertisements, resulting in a loss of impact, advertising impressions, and value to advertisers. Viewers are increasingly turning to other forms of media including on-demand digital video which may be ad-free or incorporate less advertising time than traditional television. Some viewers are shunning traditional, linear broadcast or cable television altogether (so-called "cord cutting").

Despite these trends, advertising-supported linear television is expected to continue indefinitely. There is a need for systems and methods of providing advertising-supported linear television while accommodating the preference of audiences who disfavor the traditional, interruptive advertising model. These audiences may be encouraged to stick with linear cable television, which they are long-accustomed to, if commercial interruptions could be eliminated.

Additionally, non-linear television is also frequently advertiser-supported. This includes advertiser-supported digital video recorder systems and advertiser-supported pay-per-view, video-on-demand, or streaming video services. There is a need for systems and methods of providing advertising-supported non-linear television while accommodating the preference of audiences who disfavor the traditional, interruptive advertising model.

SUMMARY OF THE INVENTION

The subject technology is directed to systems and methods for providing advertising-supported linear television, using the programmability and Internet-connectivity of modern "smart" televisions and/or "smart" cable set top boxes, "smart" DVRs, and "smart" streaming devices to enable viewers to selectively opt-out of advertisements for individual, enabled programs, while compensating broadcasters for the resulting loss of advertising revenue.

For a monthly subscription, for example, viewers on the linear TV channel in use (without requiring an input change, subscription to an "over-the-top" ("OTT") service such as Amazon Prime Video, Netflix, Hulu, or other OTT service) can seamlessly view their favorite shows entirely ad-free on linear TV channels. Upon delivering the ad-free experience, software is used to calculate and remit household-level micropayments of lost program ad revenue for participating networks.

In use in the context of pay cable TV, a normally-advertiser-supported cable TV program is delivered to a household's smart TV in the customary way, via a set-top box connected to the cable system and to a smart TV input. The normally-advertiser-supported program is detected by automatic content recognition, and as described herein in greater detail, the subject technology determines if the household is authorized to view the program ad-free (i.e., the household has a valid account). If so, the smart TV input is switched from the cable TV feed to stream an ad-free version of that same program for viewing on the smart TV. Upon conclusion of the ad-free program (and any after-reel as described below), the smart TV reverts to the initial condition of playing the cable TV feed via the set-top box until again it is triggered to stream ad-free content.

From the viewer's perspective, the viewing experience is the same as traditional cable TV except that the commercial breaks have disappeared. The viewer is thus more likely to continue in his or her customary viewing habits, including the continuing subscription to a cable TV service. Thus, the subject technology can extend the lifespan of the existing cable TV system by retaining subscribers who may otherwise turn to other viewing options to avoid commercials.

The subject technology does not require any provision in the set-top box or cable provider's own systems. Thus, it is capable of being "rolled-out" to millions of existing cable TV subscribers (provided they have an Internet-connected smart TV) without any change in the pay cable TV provision system and hardware.

The subject technology is equally applicable to advertising-supported non-linear television. Examples of advertising-supported non-linear television include a video-on-demand service supported by the display of advertising before, after, or during playback of a video-on-demand program; and a set-top digital video recorder (DVR) box supported by the display of advertising before, after, or during playback of a recorded program. Advertising-supported linear television and advertising-supported non-linear television are examples of normally-advertising-supported content.

The subject technology is also directed to software and systems to enable networks to provide individualized ad-free viewing on commercial television programming. The software includes an application program ("app") which runs on the smart playback device (for example, smart TV, smart cable box, or smart DVR). The smart playback device comprises a processor which executes instructions stored in digital memory to provide functionality as described herein.

According to an aspect of the subject technology, a viewer watching a traditional, advertising-supported network program on a smart TV or other smart playback device is presented with an on-screen interactive overlay during a program's associated on-air promotional ("promo") spot, or during the first three minutes of the start of the TV program, or up to the first commercial break in the program (usually about 9 or 10 minutes in), for example. (Linear television programs are often proceeded by a promo spot associated with the program.) The promo spot and/or program are fingerprinted and registered using an automatic content recognition ("ACR") platform for each of the smart TVs' manufacturers (i.e., each individual smart TV provided may have its own ACR platform, or a licensing agreement with a third-party ACR supplier). Potentially, any program or promotional spot is enabled to be displayed ad-free, provided that the smart TV manufacturer and the network which is supplying the content are participating in the subject technology. This app will display informational prompts within a few seconds from the start of the programmer's promo spot or program. This can be done as an overlay or with a video squeezeback.

The app will initially present a message to the consumer, similar to "Install this app to get this show without ads—10 shows free" with a button for the consumer to select on their remote control. If the consumer clicks on the button, the offer is presented with another confirmation/opt-in prompt. Once the consumer opts in, the consumer is redirected to a subscription registration page. Two options are presented to the consumer: their credit details, etc., using the TV remote control, or the consumer may use a passcode displayed on the screen (which may be a four-letter or four-number code) on a website to enter payment details. Once a user is registered, any future programs can be instantly viewed with on click of the remote control on an active icon. In that case, the app may display text such as "YOU ARE BEING REDIRECTED TO AN AD FREE VERSION OF THIS PROGRAM" or similar explanatory text. The viewer may operate the remote control of the smart TV to select the icon and use the pause feature. Selection of the icon and confirmation of a microtransaction fee, or a flat subscription fee for an extended-period (e.g. monthly or yearly) account (for example, as illustrated in FIG. 7) permits ad-free viewing of the current program on the smart TV, for the duration of the program. This is accomplished by streaming an ad-free version of the program from a cloud or video server to the viewer's smart TV. A microtransaction fee is charged to the viewer's account as payment for the ad-free program. A microcompensation is credited and/or paid to the network for the loss of advertising revenue on account of the ad-free program.

For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIGS. 2A and 2B are a high-level overview of components of an exemplary system according to an aspect of the subject technology.

FIG. 6-8 are wireframe diagrams showing the flow for registering for, and using, the ad-free service of the subject technology, or for opting out.

DETAILED DESCRIPTION OF THE DRAWINGS

Figure 1:
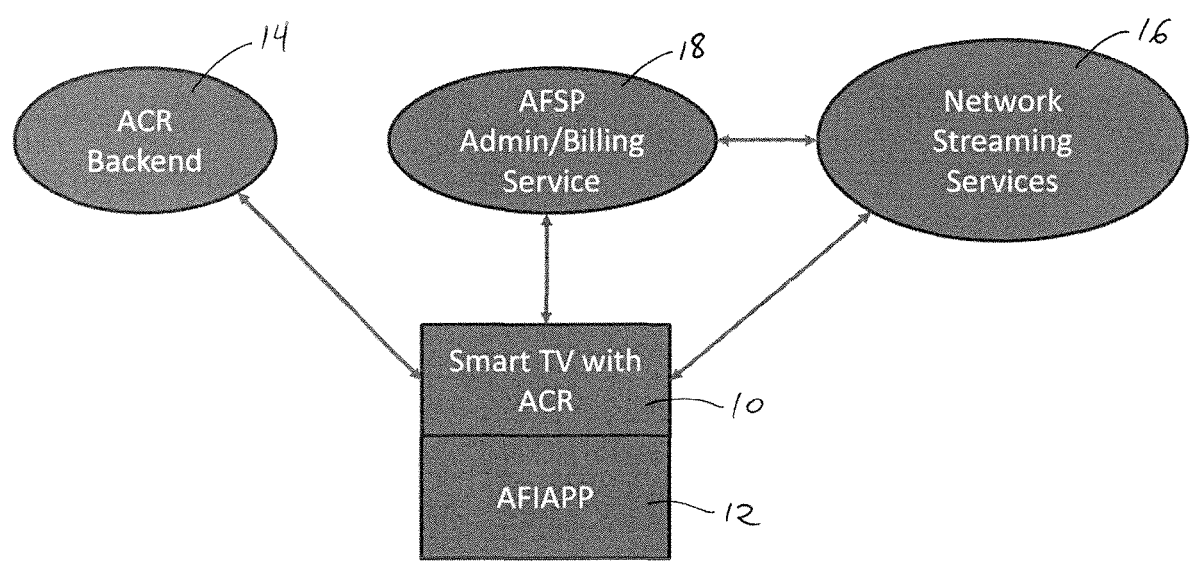
FIG. 1 is a high-level overview of components of an exemplary system according to an aspect of the subject technology.

As shown in FIG. 1, according to an aspect of the subject technology, a smart TV 10 has Internet connectivity and also has the capability of running application programs or apps. The application programs may be supplied with the TV as originally purchased, or new applications may be downloaded from a server. (It will be understood that any service or server referred to herein that is remote from the smart TV may be a cloud-based server or service.)

A smart TV is an example of a smart playback device, as that term is used herein. Additional examples of a smart playback device include any of the following, provided that the device is programmable with an app as described herein, connected to a TV and the internet, and automatic content recognition is available: a set-top digital video recorder (DVR), cable box, video-on-demand device, streaming device, and/or gaming console. It will be understood that the subject technology is equally applicable to any smart playback device. The following detailed description describes embodiments of the subject technology utilizing a smart TV, however, in other embodiments, the device is a suitably programmed and Internet-connected smart playback device.

The smart TV 10, working in conjunction with backend processors, servers and services to which it connects over the Internet, also has automatic content recognition ("ACR") capability. ACR enables recognition of content being played or displayed on the smart TV. ACR technology can identify content based on watermarking (i.e. identifying data embedded in the audio and/or video portion of a program), or by audio fingerprinting, or video fingerprinting, or a combination of the foregoing. An identifying feature (e.g. a fingerprint or watermark) of a program or its associated promo spot, detectable by ACR shall be referred to herein as an ACRIF. Some manufacturers of smart TVs include ACR capability with their products, in other cases, ACR capability is added to a smart TV by downloading an app which will run on the smart TV. ACR is currently used for applications including content identification, broadcast monitoring, and audience measurement. ACR is also currently used to identify content and to then display additional information and interactivity related to the content, which may be overlaid on the content as it is being played on the smart TV. The additional information and interactivity is retrieved from a remote service or server by the smart TV when triggered by the ACR detection.

The smart TV 10 has one or more applications running on it. According to an aspect of the subject technology, an app 12 running on the smart TV, which shall be referred to as the AFIAPP for "ad-free interface app"), is programmed and configured to enable and manage the user experience described herein. (In other embodiments of the subject technology, the AFIAPP 12 resides on a TV-attached smart cable box, smart DVR, or smart streaming device rather than a smart TV. In that embodiment, it should be understood that references herein to a smart TV are to be substituted by the smart device and its attached television.)

According to an aspect of the subject technology, an ACR backend processor 14 (which may also be referred to as an ACR backend service or ACR backend server) works in conjunction with the smart TV 10 and AFIAPP 12 to identify content being displayed on the smart TV. The ACR backend processor 14 is programmed, configured, and enabled to identify content using ACR methodology and the associated ACRIFs. The ACR backend processor 14 may also be programmed, configured, and enabled to supply apps for download to the smart TV 10 including the AFIAPP 12. The ACR backend processor 14 may also be programmed, configured, and enabled to cause the smart TV 10 to retrieve and display information, overlays, and apps for download to the smart TV 10 including the AFIAPP 12. The ACR backend processor 14 may also be programmed, configured, and enabled to send commands to the smart TV 10, or apps running on the smart TV 10, for execution on the smart TV 10. The ACR backend processor 14 may be provided, situated and managed by the manufacturer of the smart TV, or by a third-party. The ACR backend processor 14 involves a server or system of servers connected to the Internet which are programmed, configured, and enabled to communicate with the smart TV 10 and apps running on the smart TV 10 including the AFIAPP 12. It should be understood that there are numerous manufacturers of smart TVs and each may run its own ACR backend processors, or have third-parties run them. It is common in the television industry for ACR to be functioning continuously to identify the content being played on a smart TV for, e.g., audience measurement or broadcast monitoring purposes.

According to an aspect of the subject technology, a streaming service 16 is available to stream on-demand, ad-free versions of linear television programs. Internet audiovisual streaming services involve a server or system of servers connected to the Internet which are programmed, enabled and configured to stream audiovisual content over the Internet to a client. According to an aspect of the subject technology, the AFIAPP 12 is a client for requesting, receiving and displaying streaming content from a streaming service or server 16, as shall be described hereafter. Alternatively, the AFIAPP invokes a native video client subsystem of the smart TV 10 for requesting, receiving and displaying streaming content from a streaming service or server 16. Streaming services according to the subject technology may be provided, situated, and maintained by a television network; or by a third-party. It will be understood that there are multiple streaming services that may be accessed, for example, each television network might operate its own streaming service.

In an embodiment, the smart TV 10 is supplied by its manufacturer with a video player subsystem, which can used by the subject technology to stream and playback audiovisual content from a streaming service 16. In this alternative embodiment, the AFIAPP 12 invokes the manufacturer-supplied video player subsystem to act as a client to receive and play streaming video on the smart TV 10.

According to an aspect of the subject technology, an administration and billing service 18 is provided. The administration and billing service 18 involves a server or system of servers connected to the Internet which is programmed, enabled and configured to communicate with the smart TV 10 and apps running on the smart TV 10 including the AFIAPP 12; and also communicate over the Internet with the streaming service 16. The administration and billing service 18 may be provided, situated and managed by an ad-free service provider ("AFSP") which may be a television network, or the manufacturer of the smart TV 10, or a third-party. The administration and billing service 18 is programmed, enabled and configured to store data concerning television networks; content provided by networks; broadcast schedules; ACRIFs and DRMIDs (hereinafter defined) to identify and unlock content, respectively; and user account data; network accounting data; data concerning advertising sales (CPM and media costs by program and advertiser), traffic and reimbursements; among other data.

In use of the subject technology, a television network, which normally broadcasts, transmits or otherwise provides linear television programs to consumer audiences, elects to make available for ad-free viewing a certain item or items of audiovisual content, for example, an episode or episodes of a show normally broadcast or streamed in the usual linear fashion, with commercials (hereinafter, "network designated content" or NDC). As used herein, NDC refers to a single item of content (for example, an episode of a television program, a motion picture, a music video, a live presentation, a prerecorded presentation, or any other audiovisual content which might be broadcast or transmitted on linear television). The NDC may be associated with a promo spot, which would normally proceed the NDC as it is normally transmitted or broadcast for viewing. It is contemplated that a network may designate as NDC the entirety of a network's programming schedule for a given time period; or a selected part of the network's programming schedule; or even a single item of content.

Figure 3:
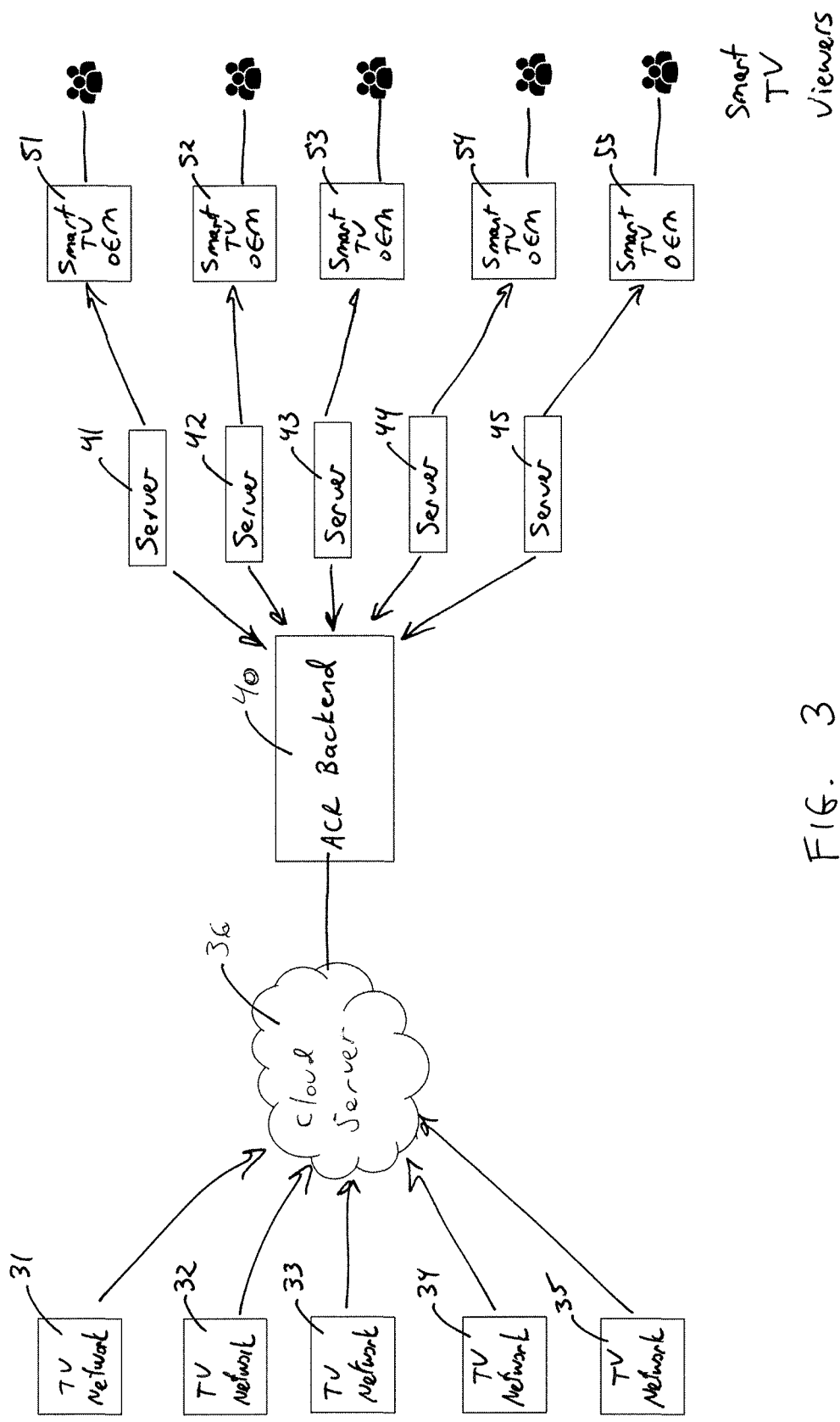
FIG. 3 is a high-level overview of components of an exemplary system according to an aspect of the subject technology.

As seen for example in FIG. 3, a content provider (e.g. a cable network or TV network 31) provides an ad-free version of the NDC ("AFNDC") on the streaming server 36, by, for example, uploading it to the server 36 and enabling access to it. (As shown in FIG. 3, multiple content providers 31-35 may participate in the subject technology and use the same streaming server 36, or different servers.) The network 31 also provides an ACRIF (or the data needed to generate an ACRIF) corresponding to the NDC to enable the subject technology to recognize when the NDC is being watched on any given smart TV 51-55 having ACR functionality.

According to an embodiment of the subject technology, the network 31 may provide a clip, segment, or slice of an initial portion of the NDC, and/or the promo spot associated with the NDC, to the AFSP, who may then use the clip to generate an ACRIF which will identify the NDC. Alternatively, the ACRIF is pre-generated and is provided by the network directly. The ACRIF is provided to the ACR backend processor 40 by the AFSP; or alternatively, the clip that can be used to generate an ACRIF is provided by the AFSP to the ACR backend processor 40, which generates and stores the ACRIF. Alternatively, the ACRIF is already stored in a pre-existing database or library available to the ACR backend 40. In either case, the ACR backend stores (or has access to) the ACRIF and is programmed, configured and enabled to recognize when the associated NDC is being played on a given smart TV 51-55. As seen in FIG. 3, front-end servers 41-45 deliver content to one or more smart TVs 51-55.

Preferably, the AFNDC is protected from unauthorized use by digital rights management ("DRM") technology, which may include cryptographic encryption of the AFNDC or a portion of the AFNDC. Accordingly, in conjunction with the ACRIF (or the data that can be used to generate an ACRIF), the network provides a DRM token, key, or other cryptographic identifier ("DRMID") to license and enable streaming of the AFNDC from the streaming server. The DRMID is specific to the NDC provided by the network to the streaming service. It should be understood that the ACRIF identifies the NDC, and the DRMID unlocks and enables access to the AFNDC corresponding to the NDC. The DRMID is stored by the administration and billing service for provision, when necessary, to unlock and license AFNDC for display on the smart TV. It will be understood that the unlocking, i.e. licensing, of AFNDC using the DRMID may be accomplished according to known DRM methodologies as may be suitable for this technological application.

In use of the subject technology, the smart TV 10 in conjunction with the ACR backend processor 14 continuously or substantially continuously monitors what is being played on the smart TV 10. This monitoring may be in the course of the usual ACR monitoring performed for audience measurement or broadcast monitoring, for example. In the alternative, this monitoring might be solely for the purpose of enabling the subject technology.

When a smart TV 10 begins playing an item of NDC, or the associated promo spot which proceeds the NDC, this is detected by the ACR backend processor 14 which has the ACRIF identifying the NDC. This identification of the NDC by the ACR process triggers the smart TV 10 to display prompts, interactive icons, and optionally to download and/or dynamically load and launch an AFIAPP 12.

The AFIAPP 12 is programmed, configured, and enabled to communicate with the administration and billing service 18 over the Internet connection. Upon being launched, the AFIAPP 12 obtains identifying information from the smart TV 10 such as a serial number, unique smart TV ID, user name, user ID, or other account-identifying or TV-identifying credential. Using this credential, the AFIAPP 12 is programmed, configured, and enabled to communicate with the administration and billing service 18 to determine whether the credential corresponds with an active, valid account registered with the administration and billing service 18. An account may be associated with an individual viewer, a household, or a given smart device. Some accounts may be enabled to watch an unlimited amount of ad-free content during a given time period (e.g. for a month); and some accounts may be set up to pay individually for each ad-free program; this is reflected in the account data, associated with the account credential and stored by the administration and billing service 18. This query of the administration and billing service using the credential will identify whether an account exists for the credential and what the status of the account is, for example:

1. Unknown TV—Not in database. TV has never before contacted the server.
2. In the database and currently enrolled in a free trial with N remaining free videos.
3. A free trial is over, not yet signed up.
4. Enrolled in a paid subscription.
5. Previously enrolled in a paid subscription, but not currently enrolled.
6. Enrolled in a subscription, but there is a problem with the payment.
7. Opted out of the service N days ago.

As an alternative to communicating with the administration and billing service 18 every time, the AFIAPP may locally store a value or token indicating that the smart TV is authorized to use the subject technology for an unlimited number of viewings until a certain date or time (for example, until the last day of the current month). The credential check may also be triggered when the smart TV is powered on, or at scheduled intervals.

The AFIAPP 12, or alternatively the native ACR capability of the smart TV, is also programmed, configured, and enabled to display text and graphics on the screen of the smart TV 10, which may include informational material, and/or active icons or areas which are selectable by the TV viewer by operation of the smart TV 10 remote control (and/or set top box remote control) or a smartphone app communicating with the smart TV 10 for control purposes. The text, graphics and active icons or active areas may be overlaid upon other content being played or displayed on the smart TV screen. For example, the text, graphics and active icons or active areas may be overlaid upon the playing and display by the smart TV 10 of the first part of an NDC, or a commercial message, or other content. This can be done as an overlay or with a video squeezeback.

The AFIAPP 12, or alternatively the native ACR capability of the smart TV 10, is programmed, configured, and enabled to display informational text and video, and optionally an active area or icon, based upon the result of the credential look-up previously described (alternatively, based on the locally-stored value or token indicating the device is authorized to use the service at this time). If the result of the credential lookup is that the account is entitled to unlimited ad-free viewing at this time (the "unlimited case"), a message indicating, in effect, "You are being automatically redirected to an ad-free version of this program." If the result of the credential lookup is that the account is entitled to pay individually for ad-free viewing (the "pay-per case"), the AFIAPP 12 will display a message indicating, in effect, "WATCH NOW AD-FREE" or "BUY" or similar explanatory text, with an active area or icon which the user may select using the remote or smartphone app.

If the result of the credential lookup is that that there is no active account corresponding to the provided credentials (the "new account case"), a message is displayed indicating, in effect, "Get this program ad-free, click for more info," with an active area or icon which the user may select using the remote or smartphone app. In all of the foregoing cases, the text/graphics and any active areas will be removed after a predetermined time-out period.

Figure 7:
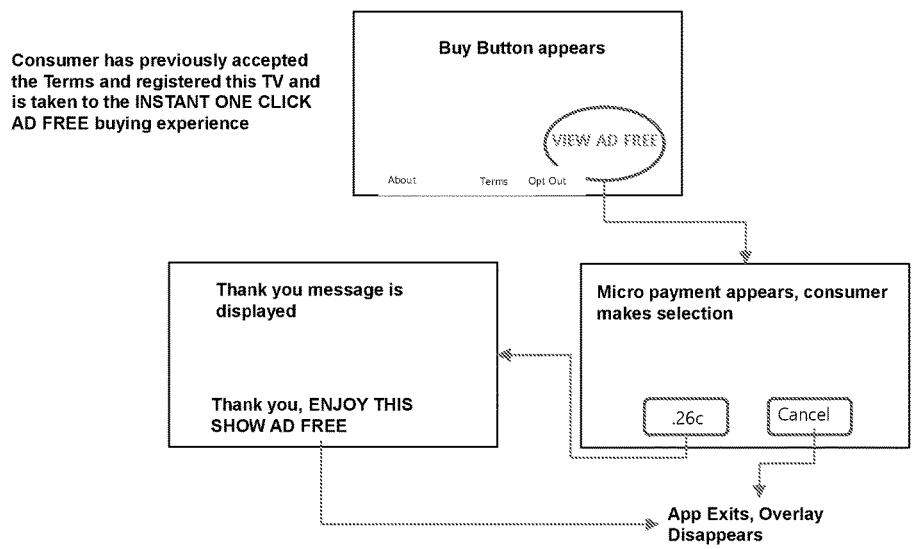

In the pay-per case, as shown for example in FIG. 7, upon selection of the active area or icon by the user, the AFIAPP 12 communicates with the administration and billing service 18 and receives the DRMID corresponding to the AFNDC. The AFIAPP 12 then communicates with the streaming server 16, using the DRMID to unlock DRM protection of the AFNDC to license playing and display of the AFNDC on the smart TV 10, and commences streaming of the AFNDC to the smart TV 19 for display, so that the user can enjoy the ad-free program. In an embodiment, the AFIAPP 12 invokes a manufacturer-supplied video player subsystem to act as the client. The account is also charged a microtransaction by the administration and billing service 18 for this instance of access to the AFNDC. The amount of the transaction may be a flat, predetermined amount, for example, US$ 0.05, 0.10. 0.25, 0.50, or an amount in the range of US$ 0.05 to 0.50. In an embodiment, the amount of the transaction may be calculated by the administration and billing service according to an algorithm. The parameters of the algorithm may include the ratings of the NDC (e.g. Nielsen ratings), actual ad rates, or CPM rates at the household level, the time of day, the region where the smart TV is located, characteristics of user account, and/or parameters and preferences specified by the network either globally, or for this particular NDC. Other parameters may be used to calculate the amount of the microtransaction according to the needs and wishes of the network and the AFSP.

In the unlimited case (for example, during a monthly, yearly, or other extended-period subscription), the AFIAPP 12 communicates with the administration and billing service 18 and retrieves the DRMID corresponding to the AFNDC. The AFIAPP 12 then communicates with the streaming server 16, using the DRMID to unlock DRM protection to license playing and display of the AFNDC, and commences streaming of the AFNDC to smart TV 10, so that the user can enjoy the ad-free program. In an embodiment, the AFIAPP 12 invokes a manufacturer-supplied video player subsystem to act as the client. The user does not need to interact with an active icon or area, or pay a microtransaction fee, in this case.

Figure 6:
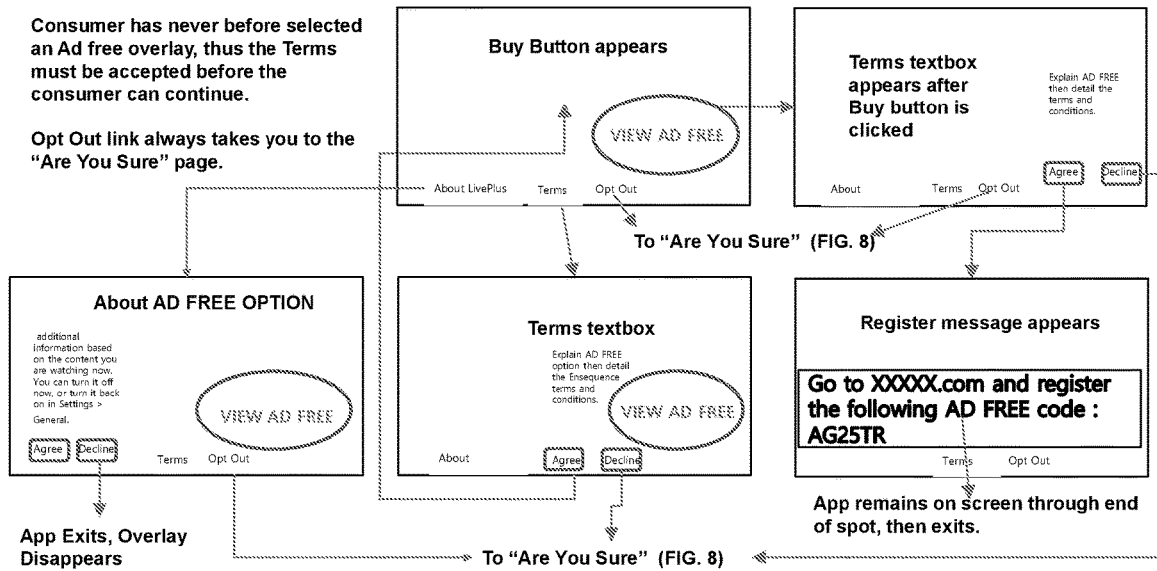

Turning now to FIG. 6, in the new account case, the AFIAPP 12 displays text and graphics constituting a series of screens for acceptance of the terms and conditions of the service, and to provide instructions to the viewer to register for the service online using a smartphone or Internet-connected computer. A viewer may choose to opt-out of receiving further prompts to view programs ad-free. An exemplary process flow and the related series of screens and prompts is shown in FIG. 6 and the text included therein.

According to another aspect of the subject technology, in each instance in which AFNDC is streamed by the AFIAPP 12, the network is compensated for displaced advertising revenue (i.e., the revenue that would have accrued to the network if program had been displayed to the viewer with advertisements). This function is preferably performed by the administrative and billing service, which is programed and configured to perform it. The amount of this compensation, microtransaction, or microcompensation may be a flat predetermined amount. In an embodiment the amount may be determined by a microcompensation algorithm. The parameters of the microcompensation algorithm may include the ratings of the NDC (e.g. Nielsen ratings), the time of day, the region where the smart TV is located, characteristics of the user account, ad sales traffic for the NDC, the expected or promised cost-per-thousand ("CPM") of the NDC if it had been watched in the usual linear way with commercials, and/or parameters and preferences specified by the network either globally, or for this particular NDC. The algorithm may mathematically convert the expected or promised cost-per-thousand ("CPM") of the NDC into a value of "revenue per viewer" ("RPV"). Different participating networks or groups of networks may be compensated using different algorithms, for example, in one case a network may agree to participate in the subject technology for a flat fee, while in a second case a group of networks prefers to be compensated for each household that subscribes to the service, and in a third case a network prefers to receive the RPV for advertising revenue actually lost. Other parameters may be used to calculate the amount of the microcompensation according to the needs and wishes of the network and the AFSP. Preferably, the amount of the microcompensation is related to the displaced advertising revenue. Preferably, the amount of the microcompensation is calculated to make the network "whole," or even to receive incremental value above, the loss of advertising revenue. It may be equal to the entire amount of the displaced advertising revenue, or may be a fraction of the displaced advertising revenue, or the displaced advertising revenue plus a premium. The displaced advertising revenue and/or microcompensation may be accounted for in an incorruptible digital ledger (using blockchain technology for example). The displaced advertising revenue and/or microcompensation may be accounted for, per viewer, on a show by show basis. The displaced advertising revenue and/or microcompensation may be reconciled against the advertising audience guarantee (previously provided by the network to the advertiser or media broker) and the compensatory payment calculated, optionally batched, and the payment completed.

For example, consider a 60-minute pay cable TV program with 14 minutes of sold advertising (i.e., 28 units of advertising) having a CPM of $17.50 within the program. The household-level compensation could then be calculated as the actual CPM ($17.50/1000)*28 units of advertising per hour=$0.49 per household. The subject technology determines how many households watched the program ad-free using the subject technology, for example, 5,000 households. The network is compensated with $2,450 ($0.49*5,000).

An aspect of the subject technology is further illustrated in FIGS. 2A and 2B. Smart TV 100 is located in a household and has running thereon an AFIAPP 101 of the subject technology. Smart TV 100 is connected by connection 103 to a cable TV set-top box 102. Box 102 is connected to a cable TV provider in the standard way. Smart TV 100 is also connected via connection 105 to the Internet. Smart TV 100 is capable of playing a feed of audiovisual content provided by the cable TV provider through set top box 102 via connections 103, 104 in the standard way, and is also capable of playing streaming audiovisual content from the Internet via connection 105.

In FIG. 2A, a normally-advertiser-supported program 106 is being delivered to smart TV 100 in the customary way, via set-top box 102. The normally-advertiser-supported program is detected by ACR, and as described herein in greater detail, the subject technology determines if the household is authorized to view the program ad-free (by credential lookup or checking a locally-stored value or token). If so authorized, the smart TV input is switched as in FIG. 2B to stream an ad-free version 107 of program 106 for viewing on the smart TV 100. Upon conclusion of the ad-free program 106 (and any after-reel as described below), the smart TV reverts to the condition of FIG. 2A, playing from the cable TV feed until again it is triggered to stream ad-free content as in FIG. 2B.

It should be noted that this is done without any involvement of set-top box 102 and occurs without any intervention by the viewer. Thus, from the viewer's perspective, all that seems to be happening is that the commercial breaks have disappeared from the normally-advertiser-supported program. The viewer can watch cable TV in the manner that he or she may be accustomed to doing, and after signing up for the service of the subject technology, the commercial breaks seem to disappear. Additionally, no provision is required in the set-top box 102 to enable the subject technology. Therefore the subject technology is easily "rolled out" to the existing base of millions of cable TV subscribers.

Figure 4:
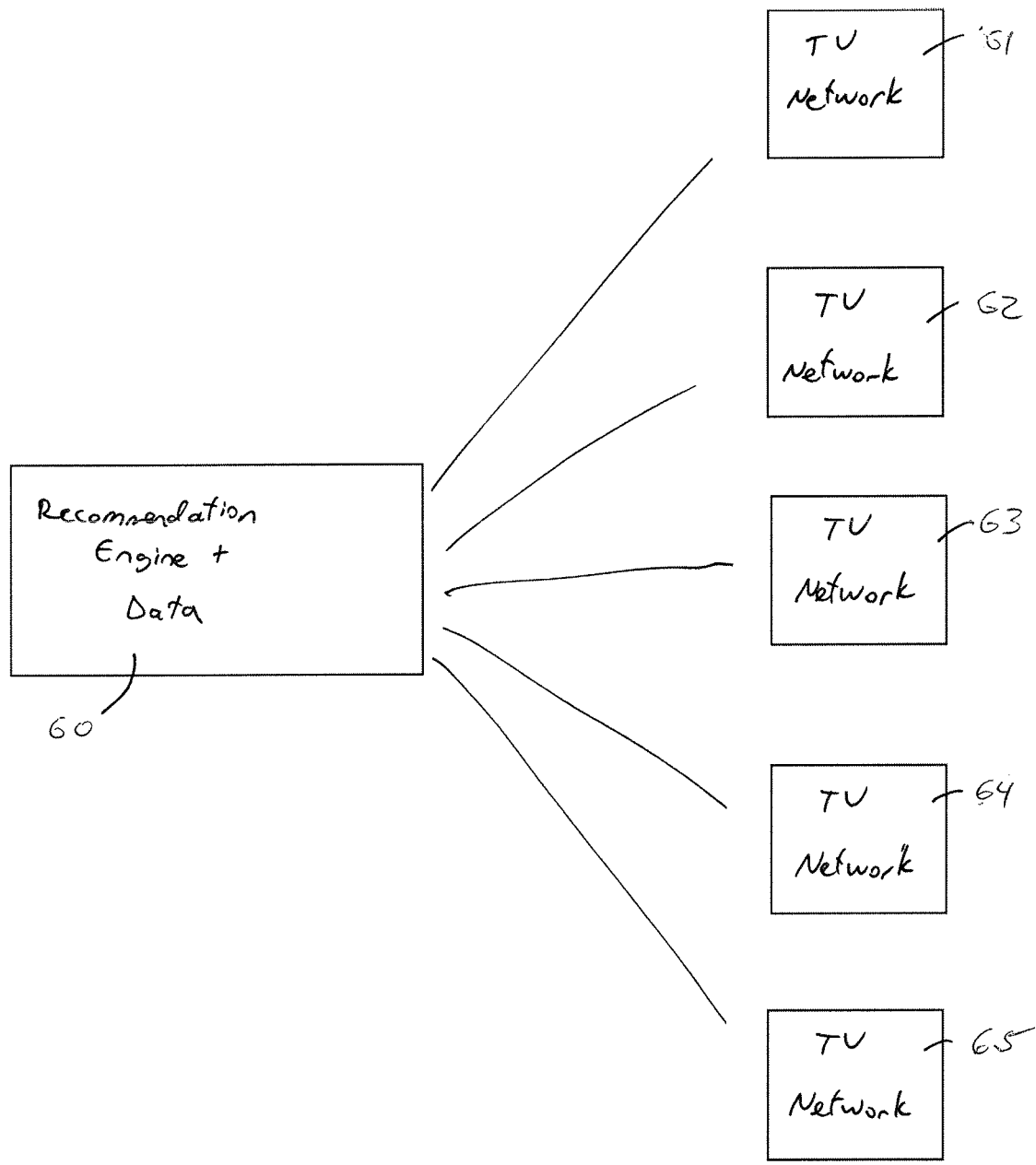
FIG. 4 is a high-level overview of components of an exemplary system according to an aspect of the subject technology in which a recommendation engine is employed to generate supplemental content.
Figure 5:
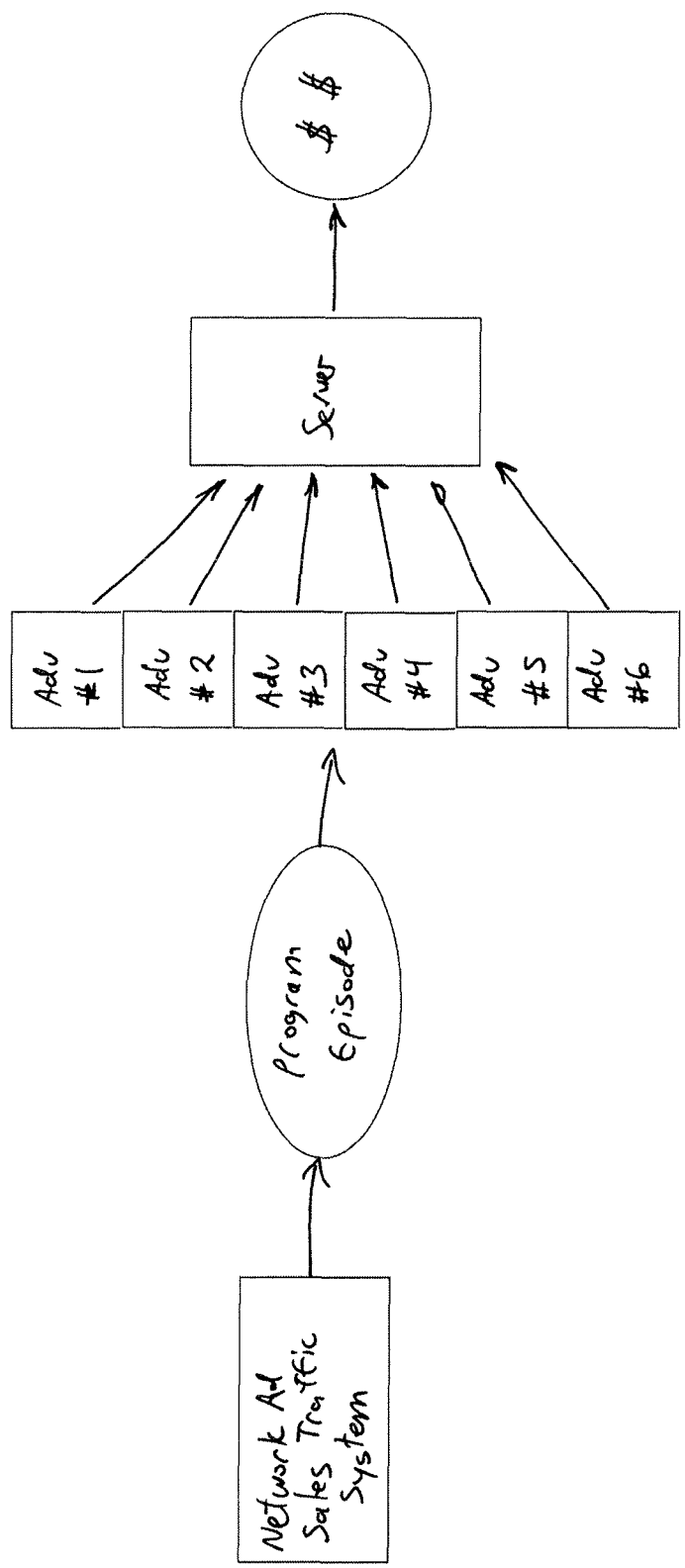
FIG. 5 is a high-level overview of components of an exemplary system according to an aspect of the subject technology related to microcompensation for displaced advertising revenue.

It is contemplated that the AFNDC has a shorter running time than the NDC (due to the lack of commercial breaks in the AFNDC). For example, a typical 30-minute item of NDC may result in an AFNDC having a running time of 22-minutes when streamed to the smart TV 10, leaving a time gap at the end of the AFNDC program. Therefore, according to another aspect of the subject technology, the resulting time gap between the end of the AFNDC stream and the scheduled beginning of the next program is filled with supplemental programming, which is streamed (as was the AFNDC) from a streaming service to the viewer's smart TV. The supplemental programming may be personalized for the viewer using a recommendation engine. The supplemental programming may be streamed from the same streaming service 16 as the AFNDC, or from a second streaming service. The supplemental programming may consist of promotional video (e.g. a "sizzle reel") to promote network shows the viewer may be interested in. For example, as shown in FIG. 4, a plurality of networks 61-65 provides data and audiovisual clips to a recommendation engine 60, which is programmed, configured and enable to generate the supplemental programming and upload it to a streaming server for provision to viewers as described.

When streaming of the AFNDC and any supplemental programming is completed, preferably the AFIAPP then returns the smart TV to the input that was playing when the AFIAPP was first invoked. That is, if when the ACR system invoked the app, the TV input was set to HDMI-1, the TV should be returned to that state and the AFIAPP should then exit.

In an embodiment of the subject technology, there is provided a method for providing an advertising-free audiovisual digital content item on an Internet-connected smart playback device in a normally-advertising-supported environment of digital content items provided by a plurality of content providers, the method comprising the following steps. First, detecting a normally-advertising-supported program (or its promo) being played to the smart device via a first input. Then, determining whether the smart device is currently authorized to play an advertising-free version of the program. If not authorized, continuing to play the normally-advertising-supported program via a first input. If authorized, switching the input of the smart TV to a second, Internet-connected input and streaming an advertising-free version of the program via the second input. Then, upon conclusion of the advertising-free version of the program, switching back to the first input.

In an embodiment of the subject technology, there is provided a method for providing an advertising-free audiovisual digital content item on an Internet-connected smart playback device in a normally-advertising-supported environment of digital content items provided by a plurality of content providers, the method comprising the following steps. 1. Automatically recognizing a normally-advertising-supported audiovisual digital content item playing on the smart playback device to result in a digital ACRIF corresponding to the audiovisual digital content item and uniquely identifying the audiovisual digital content item. 2. Communicating an account-identifying credential (which may be identify a user, a household or the smart playback device) to a remote administration and billing service via an Internet connection. 3. Receiving an authorization signal from the remote administration and billing service based on the credential, via the Internet connection. 4. Conditional on the authorization signal indicating that the user and/or smart device is authorized to play an advertisement-free version of the content, perform the following steps (otherwise, continue playing the advertiser-supported content). 5. Communicating the ACRIF to the remote administration and billing service via the Internet connection. 6. Receiving a digital rights management token via the Internet connection from the remote administration and billing service, the digital rights management token corresponding to the ACRIF. 7. Communicating the ACRIF via the Internet connection to a remote streaming server having an advertising-free version of the audiovisual digital content item provided thereon by a one of said plurality of content providers. 8. Enabling streaming playback of the advertising-free version of the audiovisual digital content item from the remote streaming server to the smart playback device using the digital rights management token. 9. Playing the advertising-free version of the audiovisual digital content item on the smart playback device. 10. Crediting a first microtransaction fee to a first account corresponding to the one of said plurality of content providers. The amount of the microtransaction fee is predetermined or is calculated as disclosed herein previously. If the account corresponding to the account-identifying credential is a "pay-per" account, the method comprises the further step of charging a second microtransaction fee against the account corresponding to the account-identifying credential.

In an embodiment of the subject technology, there is provided a method for playback of an audiovisual digital content item on an Internet-connected smart playback device in a normally-advertising-supported environment (e.g., advertising-supported linear cable television, advertising-supported linear over-the-air television, advertising-supported DVR, advertising-supported video-on-demand, or a combination of any of the foregoing). The audiovisual content item is provided by a content provider in an advertising-supported version and in an advertising-free version. The method comprising the steps of:

a. automatically recognizing an advertising-supported version of the audiovisual digital content item playing on the smart TV to result in a digital ACRIF corresponding to the advertising-supported version of the audiovisual digital content item and distinguishing the audiovisual digital content item from other content items in the environment;

b. communicating a credential to a remote administration and billing service, the credential intended to identify a playback account (e.g., the smart playback device or a user account corresponding to a person or household);

c. receiving an authorization signal from the remote administration and billing service based on the credential, the authorization signal being selected from a first value, a second value, and a third value, provided that the first value indicates that the credential does not correspond to a valid playback account, the second value indicates that the playback account is valid for unlimited viewing, and the third value indicates that the playback account is valid for pay-per viewing;

d. conditional on the authorization signal having the first value: displaying instructions on the smart device to instruct a viewer to register for a valid playback account; and receiving information from the user via an input device in response to the instructions;

e. conditional on the information indicating that the user declines to register for a valid playback account: continuing to play the advertiser-supported version of the content item on the smart playback device (and in this case, the further steps of this method would not be triggered).

f. conditional on the information indicating that the user agrees to register for a valid playback account: communicating the information to the remote administration and billing service; creating the valid playback account on the remote administration and billing service using the information; setting the authorization signal to the second ("unlimited") or third ("pay-per") value based on the information;

g. conditional on the authorization signal having the second or third value: communicating the ACRIF to the remote administration and billing service; receiving a DRM token from the remote administration and billing service, the DRM token corresponding to the ACRIF and effective to unlock the advertising-free version of the audiovisual digital content item; communicating the ACRIF to a remote streaming server having an advertising-free version of the audiovisual digital content item provided thereon by the content provider; enabling streaming playback of the advertising-free version of the audiovisual digital content item from the remote streaming server to the smart playback device using the DRM token; playing the advertising-free version of the audiovisual digital content item on the smart playback device; and crediting a first microtransaction (i.e. microcompensation) fee to a first account corresponding to the content provider (the crediting step may occur at any point after the authorization signal is determined);

h. conditional on the authorization signal having the third ("pay-per") value: charging a second microtransaction fee against a second account corresponding to the playback account.

While specific embodiments of the invention have been shown and described in detail to illustrate the application of the principles of the invention, it will be understood that the invention may be embodied otherwise without departing from such principles. It will also be understood that the present invention includes any combination of the features and elements disclosed herein and any combination of equivalent features. The exemplary embodiments shown herein are presented for the purposes of illustration only and are not meant to limit the scope of the invention. Thus, all the features of all the embodiments disclosed herein are interchangeable so that any element of any embodiment may be applied to any of the embodiments taught herein.

What is claimed is:

1. A method for providing an advertising-free audiovisual digital content item on an Internet-connected smart playback device in a normally-advertising-supported environment of digital content items provided by a plurality of content providers, the method comprising the steps of:

automatically recognizing a normally-advertising-supported audiovisual digital content item or promo spot for the audiovisual digital content item playing on the smart playback device to result in a digital ACRIF corresponding to the audiovisual digital content item and uniquely identifying the audiovisual digital content item;

communicating an account-identifying credential to a remote administration and billing service;

receiving an authorization signal from the remote administration and billing service based on the credential;

communicating the ACRIF to the remote administration and billing service;

receiving a digital rights management token corresponding to the ACRIF;

communicating the ACRIF to a remote streaming server having an advertising-free version of the audiovisual digital content item provided thereon by a one of said plurality of content providers;

enabling streaming playback of the advertising-free version of the audiovisual digital content item from the remote streaming server to the smart playback device using the digital rights management token;

playing the advertising-free version of the audiovisual digital content item on the smart playback device; and crediting a first amount to a first account corresponding to the one of said plurality of content providers.

2. The method of claim 1 further comprising the step of charging a second amount against a second account corresponding to the account-identifying credential.

3. The method of claim 1 wherein the first amount is a compensation to the one of said plurality of content providers for a loss of advertising revenue caused by the playback of the advertising-free version of the audiovisual digital content item.

4. The method of claim 1 wherein the first amount has a flat predetermined amount.

5. The method of claim 1 wherein the first amount corresponds to an expected or promised cost-per-thousand of the normally-advertising-supported audiovisual digital content item.

6. The method of claim 1 wherein the first amount corresponds to a revenue-per-viewer of the normally-advertising-supported audiovisual digital content item.

7. A method for playback of an audiovisual digital content item on an Internet-connected smart playback device in a normally-advertising-supported environment in which the audiovisual content item is provided by a content provider in an advertising-supported version and in an advertising-free version, the method comprising the steps of:

a. automatically recognizing an advertising-supported version of the audiovisual digital content item or promo spot for the audiovisual digital content item playing on the smart playback device to result in a digital ACRIF corresponding to the audiovisual digital content item and distinguishing the audiovisual digital content item from other content items in the environment;

b. communicating a credential to a remote administration and billing service, the credential intended to identify a playback account;

c. receiving an authorization signal from the remote administration and billing service based on the credential;

d. communicating the ACRIF to the remote administration and billing service;

e. receiving a DRM token, the DRM token corresponding to the ACRIF and effective to unlock the advertising-free version of the audiovisual digital content item;

f. communicating the ACRIF to a remote streaming server having the advertising-free version of the audiovisual digital content item;

g. enabling streaming playback of the advertising-free version of the audiovisual digital content item from the remote streaming server to the smart playback device using the DRM token;

h. playing the advertising-free version of the audiovisual digital content item on the smart playback device; and i. crediting a first microtransaction to a first account corresponding to the content provider.

8. The method of claim 7 further comprising the step of charging a second microtransaction against a second account corresponding to the playback account.

9. The method of claim 7 wherein the first microtransaction is a compensation to the content provider for a loss of advertising revenue caused by the playback of the advertising-free version of the audiovisual digital content item.

10. The method of claim 7 wherein the first microtransaction has a flat predetermined amount.

11. The method of claim 7 wherein the first microtransaction corresponds to an expected or promised cost-per-thousand of the normally-advertising-supported audiovisual digital content item.

12. The method of claim 7 wherein the first microtransaction corresponds to a revenue-per-viewer of the normally-advertising-supported audiovisual digital content item.

* * * * *